(12) United States Patent
Colgrove et al.

(10) Patent No.: US 9,436,720 B2
(45) Date of Patent: Sep. 6, 2016

(54) SAFETY FOR VOLUME OPERATIONS

(71) Applicant: PURE Storage, INC., Mountain View, CA (US)

(72) Inventors: John Colgrove, Los Altos, CA (US); Ethan Miller, Santa Cruz, CA (US); John Hayes, Mountain View, CA (US); Cary Sandvig, Palo Alto, CA (US); Christopher Golden, Mountain View, CA (US); Jianting Cao, Mountain View, CA (US)

(73) Assignee: Pure Storage, Inc., Mountain View, CA (US)

( * ) Notice: Subject to any disclaimer, the term of this patent is extended or adjusted under 35 U.S.C. 154(b) by 359 days.

(21) Appl. No.: 14/046,878

(22) Filed: Oct. 4, 2013

(65) Prior Publication Data
US 2014/0195762 A1 Jul. 10, 2014

Related U.S. Application Data

(60) Provisional application No. 61/751,142, filed on Jan. 10, 2013.

(51) Int. Cl.
*G06F 3/06* (2006.01)
*G06F 17/30* (2006.01)
*G06F 12/08* (2016.01)
*G06F 12/12* (2016.01)
*G06F 13/00* (2006.01)

(52) U.S. Cl.
CPC ......... *G06F 17/30345* (2013.01); *G06F 3/061* (2013.01); *G06F 3/065* (2013.01); *G06F 3/0605* (2013.01); *G06F 3/067* (2013.01); *G06F 3/0608* (2013.01); *G06F 3/0611* (2013.01); *G06F 3/0614* (2013.01); *G06F 3/0619* (2013.01); *G06F 3/0626* (2013.01); *G06F 3/0641* (2013.01); *G06F 3/0652* (2013.01); *G06F 3/0664* (2013.01); *G06F 3/0665* (2013.01); *G06F 3/0667* (2013.01); *G06F 3/0671* (2013.01); *G06F 3/0683* (2013.01); *G06F 3/0689* (2013.01); *G06F 12/0891* (2013.01); *G06F 12/121* (2013.01); *G06F 17/30156* (2013.01)

(58) Field of Classification Search
None
See application file for complete search history.

(56) References Cited

U.S. PATENT DOCUMENTS

2007/0300008 A1* 12/2007 Rogers ............... G06F 12/0292
711/103
2010/0042802 A1 2/2010 Helman et al.

FOREIGN PATENT DOCUMENTS

WO 2006/083327 8/2006

OTHER PUBLICATIONS

International Search Report and Written Opinion in application No. PCT/US2014/011003, mailed Mar. 7, 2014, pp. 1-11.

* cited by examiner

*Primary Examiner* — Scott Sun
(74) *Attorney, Agent, or Firm* — Edward J. Lenart; Kennedy Lenart Spraggins LLP

(57) ABSTRACT

A system and method for maintaining the safety of volume operations. A storage controller receives a request to delete a first volume. In response to this request, the storage controller can delete a link between the first volume and its anchor medium. The storage controller can also delay the deletion of the first volume's anchor medium. Later on, if the user wishes to restore the first volume, the storage controller can reconnect the first volume to its previous anchor medium, effectively restoring the first volume to its former state and undoing the deletion operation.

20 Claims, 7 Drawing Sheets

| Medium ID | Range | State | Basis | Offset | Underlying | Stable |
|---|---|---|---|---|---|---|
| 1 | 0-999 | Q | 1 | 0 | 1 | Y |
| 2 | 0-99 | QU | 2 | 0 | 1 | Y |
| 2 | 100-999 | Q | 2 | 0 | 1 | Y |
| 5 | 0-999 | RU | 5 | 0 | 2 | N |
| 8 | 0-499 | R | 8 | 500 | 1 | N |
| 10 | 0-999 | QU | 10 | 0 | 1 | Y |
| 14 | 0-999 | RU | 14 | 0 | 10 | Y |
| 18 | 0-999 | RU | 18 | 0 | 14 | N |
| 25 | 0-999 | RU | 25 | 0 | 14 | Y |
| 33 | 0-999 | RU | 33 | 0 | 25 | N |
| 35 | 0-299 | RU | 35 | 400 | 18 | N |
| 35 | 300-499 | RU | 35 | -300 | 33 | Y |
| 35 | 500-899 | RU | 35 | -400 | 5 | N |

Q – Quiescent; R – Registered; U – Unmask

FIG. 3

SAFETY FOR VOLUME OPERATIONS

CROSS REFERENCE TO RELATED APPLICATIONS

This application claims the benefit of U.S. Provisional Application No. 61/751,142, filed Jan. 10, 2013, the entirety of which is incorporated herein by reference.

BACKGROUND OF THE INVENTION

1. Field of the Invention

This invention relates to restoring deleted volumes in a storage system.

2. Description of the Related Art

As computer memory storage and data bandwidth increase, so does the amount and complexity of data that businesses daily manage. Large-scale distributed storage systems, such as data centers, typically run many business operations. A datacenter, which may also be referred to as a server room, is a centralized repository, either physical or virtual, for the storage, management, and dissemination of data pertaining to one or more businesses. A distributed storage system may be coupled to client computers interconnected by one or more networks. If any portion of the distributed storage system has poor performance, company operations may be impaired. A distributed storage system therefore maintains high standards for data availability and high-performance functionality.

Software applications, such as a logical volume manager or a disk array manager, provide a means of allocating space on mass-storage arrays. In addition, this software allows a system administrator to create units of storage groups including logical volumes. Storage virtualization provides an abstraction of logical storage from physical storage in order to access logical storage without end-users identifying physical storage.

To support storage virtualization, a volume manager performs input/output (I/O) redirection by translating incoming I/O requests using logical addresses from end-users into new requests using addresses associated with physical locations in the storage devices. As some storage devices may include additional address translation mechanisms, such as address translation layers which may be used in solid state storage devices, the translation from a logical address to another address mentioned above may not represent the only or final address translation.

For many storage systems, volume operations may be performed on a frequent basis. For example, large numbers of volumes may be created and deleted on a daily basis. From time to time, a user may inadvertently delete a volume and then realize later that they wish to restore the volume. However, in conventional storage systems, once a volume is deleted, it is impossible to restore the deleted volume.

In view of the above, systems and methods for allowing deleted volumes to be restored.

SUMMARY OF THE INVENTION

Various embodiments of systems and methods for reversing volume operations are contemplated.

A storage system may include a storage controller and one or more storage devices. The storage system may be coupled to one or more host client systems. In one embodiment, the storage controller may utilize volumes and mediums to track client data that is stored in the storage system. A medium is defined as a logical grouping of data, and each medium has an identifier with which to identify the logical grouping of data.

The storage controller may maintain a volume to medium mapping table to map each volume to a single medium, and this medium is referred to as the volume's anchor medium. Each medium may be mapped to any number of other mediums, and the storage controller may also maintain a medium mapping table to track relationships between anchor mediums and underlying mediums, with each underlying medium representing a snapshot.

In one embodiment, the storage controller may be configured to allow volume operations to be reversed. A storage controller may receive a first request to delete a first volume. The first volume may have a first medium as its anchor medium. In response to receiving the first request, the storage controller may remove the link between the first volume and the first medium. The storage controller may delay deleting the first medium for a first period of time or until the storage space utilized by the first medium is needed for storing other data. The first period of time may be programmable and may vary according to the embodiment. The storage controller may also temporarily store an indication of the previous link between the first volume and the first medium in case the user wishes to restore this link.

At a later point in time, the user may wish to restore the first volume. The user may generate a second request to restore the first volume and send the second request to the storage controller. In one embodiment, in response to receiving the second request, the storage controller may restore the link between the first volume and the first medium. In another embodiment, in response to receiving the second request, the storage controller may create a second medium, store an indication that the first medium underlies the second medium, and then create a link between the first volume and the second medium. In this embodiment, changes to the reconnected volume may be distinguished from those preceding disconnection.

These and other embodiments will become apparent upon consideration of the following description and accompanying drawings.

BRIEF DESCRIPTION OF THE DRAWINGS

FIG. 3 illustrates one embodiment of a medium mapping table.

Figure 1:
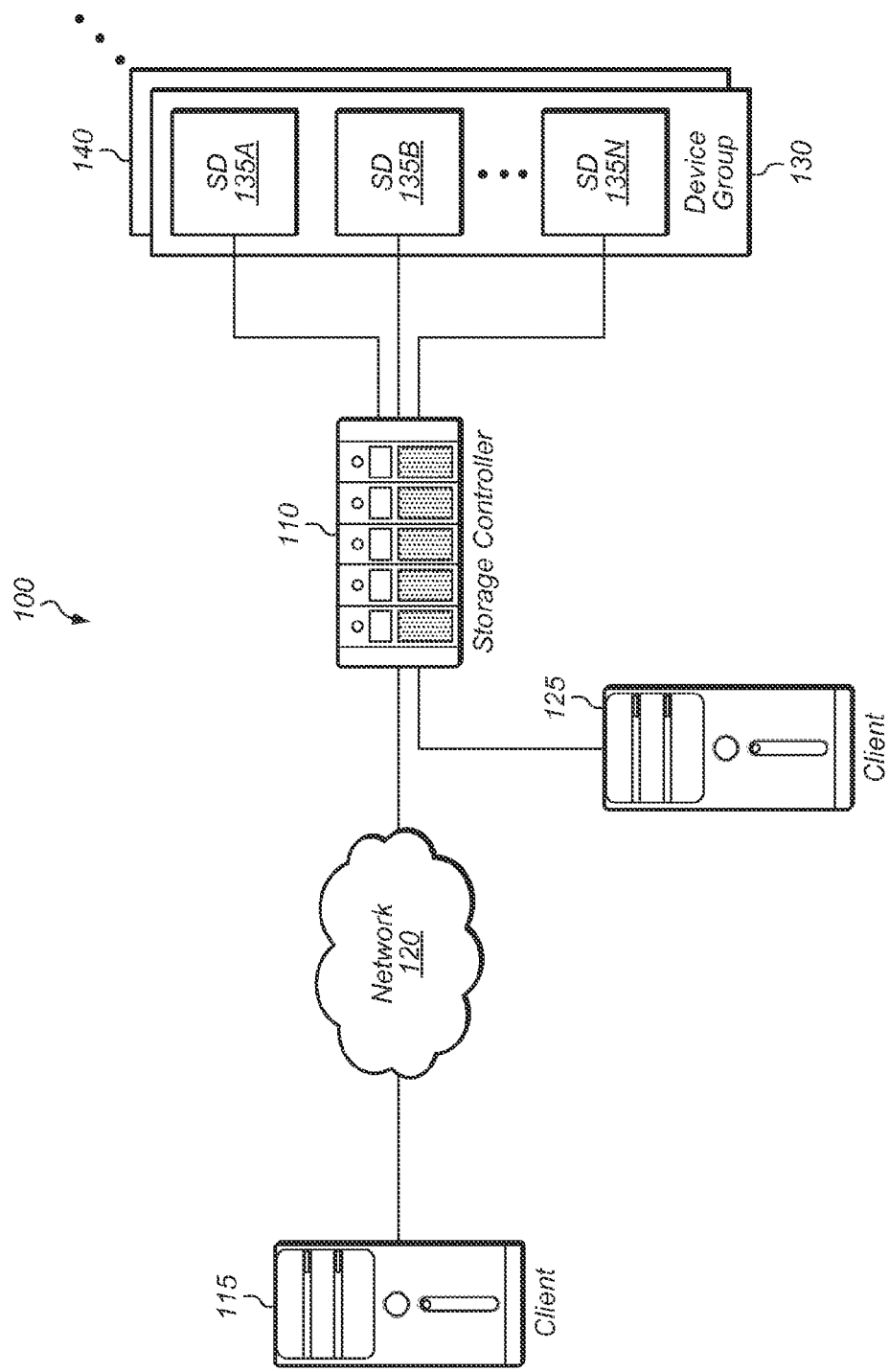
FIG. 1 is a generalized block diagram illustrating one embodiment of a storage system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Referring now to FIG. 1, a generalized block diagram of one embodiment of a storage system 100 is shown. Storage system 100 may include storage controller 110 and storage device groups 130 and 140, which are representative of any number of storage device groups (or data storage arrays). As shown, storage device group 130 includes storage devices 135A-N, which are representative of any number and type of storage devices (e.g., solid-state drives (SSDs)). Storage controller 110 may be coupled directly to client computer system 125, and storage controller 110 may be coupled remotely over network 120 to client computer system 115. Clients 115 and 125 are representative of any number of clients which may utilize storage controller 110 for storing and accessing data in system 100. It is noted that some systems may include only a single client, connected directly or remotely to storage controller 110.

Storage controller 110 may include software and/or hardware configured to provide access to storage devices 135A-N. Although storage controller 110 is shown as being separate from storage device groups 130 and 140, in some embodiments, storage controller 110 may be located within one or each of storage device groups 130 and 140. Storage controller 110 may include or be coupled to a base operating system (OS), a volume manager, and additional control logic for implementing the various techniques disclosed herein.

Storage controller 110 may include and/or execute on any number of processors and may include and/or execute on a single host computing device or be spread across multiple host computing devices, depending on the embodiment. In some embodiments, storage controller 110 may generally include or execute on one or more file servers and/or block servers. Storage controller 110 may use any of various techniques for replicating data across devices 135A-N to prevent loss of data due to the failure of a device or the failure of storage locations within a device. Storage controller 110 may also utilize any of various fine-grained deduplication techniques for reducing the amount of data stored in devices 135A-N by deduplicating common data segments.

Storage controller 110 may also be configured to create and manage snapshots in system 100. Accordingly, a set of mediums may be recorded and maintained by storage controller 110. Most of the mediums may be read-only except for one or more selected mediums such as the most recent medium in use by a particular volume. A read-only medium may represent a previously taken snapshot. Each medium logically comprises all of the blocks in the medium. However, only the blocks that were changed from the time the medium was created to the time the medium was closed are saved and mappings to these blocks may also be maintained with the medium.

In various embodiments, multiple mapping tables may be maintained by storage controller 110. These mapping tables may include a medium mapping table, a volume-to-medium mapping table, an address translation table, a deduplication table, an overlay table, and/or other tables. In some embodiments, the information stored in two or more of these tables may be combined into a single table. The medium mapping table may be utilized to record and maintain the mappings between mediums and underlying mediums and the volume-to-medium mapping table may be utilized to record and maintain the mappings between volumes and mediums.

The address translation table may include a plurality of entries, with each entry holding a virtual-to-physical mapping for a corresponding data component. This mapping table may be used to map logical read/write requests from each of the client computer systems 115 and 125 to physical locations in storage devices 135A-N. A "physical" pointer value may be read from the mappings associated with a given medium during a lookup operation corresponding to a received read/write request. This physical pointer value may then be used to locate a physical location within the storage devices 135A-N. It is noted that the physical pointer value may be used to access another mapping table within a given storage device of the storage devices 135A-N. Consequently, one or more levels of indirection may exist between the physical pointer value and a target storage location.

In various embodiments, the address translation table may be accessed using a key comprising a medium ID, a logical or virtual address, a sector number, and so forth. A received read/write storage access request may identify a particular volume, sector, and length. The volume ID may be mapped to a medium ID using the volume to medium mapping table. A sector may be a logical block of data stored in a medium. Sectors may have different sizes on different mediums. The address translation table may map a medium in sector-size units. In one embodiment, the key value for accessing the address translation table may be the combination of the medium ID and the received sector number. A key is an entity in a mapping table that distinguishes one row of data from another row. In other embodiments, other types of address translation tables may be utilized.

In one embodiment, the address translation table may map mediums to physical pointer values. Depending on the embodiment, a physical pointer value may be a physical address or a logical address which the storage device maps to a physical location within the device. In one embodiment, an index may be utilized to access the address translation table. The index may identify locations of mappings within the address translation table. The index may be queried with a key value generated from a medium ID and sector number, and the index may be searched for one or more entries which match, or otherwise correspond to, the key value. Information from a matching entry may then be used to locate and retrieve a mapping which identifies a storage location which is the target of a received read or write request. In one embodiment, a hit in the index provides a corresponding virtual page ID identifying a page within the storage devices of the storage system, with the page storing both the key value and a corresponding physical pointer value. The page may then be searched with the key value to find the physical pointer value.

The deduplication table may include information used to deduplicate data at a fine-grained level. The information stored in the deduplication table may include mappings between one or more calculated hash values for a given data component and a physical pointer to a physical location in one of the storage devices 135A-N holding the given data component. In addition, a length of the given data component and status information for a corresponding entry may be stored in the deduplication table. It is noted that in some embodiments, one or more levels of indirection may exist between the physical pointer value and the corresponding physical storage location. Accordingly, in these embodiments, the physical pointer may be used to access another mapping table within a given storage device of the storage devices 135A-N.

Storage controller 110 may be configured to allow a deleted volume to be restored if the user determines that the volume was deleted by mistake. In one embodiment, storage controller 110 may delete a volume by deleting the entry corresponding to the volume in the volume to medium mapping table. This will remove the link between the volume and its anchor medium. Also, the storage controller may store an indication of the previous mapping between the deleted volume and its anchor medium. This mapping may be stored in a log, in a table, or in another location, depending on the embodiment. Then, at a later point in time, when a user requests that the deleted volume be restored, the storage controller may retrieve the mapping and use it to recreate the link between the deleted volume and its anchor medium. When this link is recreated, this effectively restores the deleted volume to its previous state.

It is noted that in alternative embodiments, the number and type of client computers, storage controllers, networks, storage device groups, and data storage devices is not limited to those shown in FIG. 1. At various times one or more clients may operate offline. In addition, during operation, individual client computer connection types may change as users connect, disconnect, and reconnect to system 100. Further, the systems and methods described herein may be applied to directly attached storage systems or network attached storage systems and may include a host operating system configured to perform one or more aspects of the described methods. Numerous such alternatives are possible and are contemplated.

Network 120 may utilize a variety of techniques including wireless connection, direct local area network (LAN) connections, wide area network (WAN) connections such as the Internet, a router, storage area network, Ethernet, and others. Network 120 may comprise one or more LANs that may also be wireless. Network 120 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 120. The network 120 may interface with a set of communications protocols used for the Internet such as the Transmission Control Protocol (TCP) and the Internet Protocol (IP), or TCP/IP.

Client computer systems 115 and 125 are representative of any number of stationary or mobile computers such as desktop personal computers (PCs), servers, server farms, workstations, laptops, handheld computers, servers, personal digital assistants (PDAs), smart phones, and so forth. Generally speaking, client computer systems 115 and 125 include one or more processors comprising one or more processor cores. Each processor core includes circuitry for executing instructions according to a predefined general-purpose instruction set. For example, the x86 instruction set architecture may be selected. Alternatively, the ARM®, Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

Figure 2:
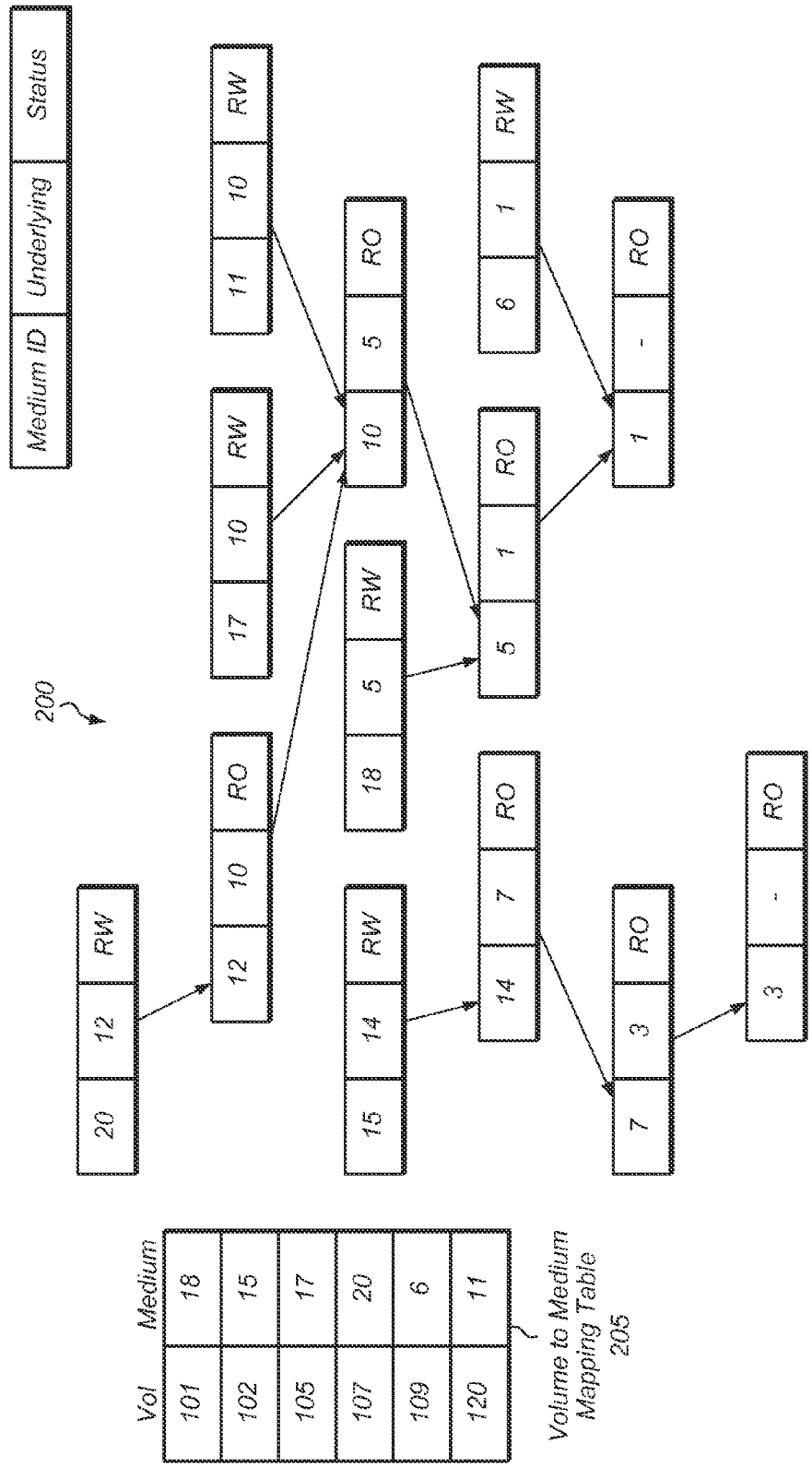
FIG. 2 is a generalized block diagram of one embodiment of a directed acyclic graph (DAG) of mediums.

Referring now to FIG. 2, a block diagram illustrating a directed acyclic graph (DAG) 200 of mediums is shown. Also shown is a volume to medium mapping table 205 which shows which medium a volume maps to for each volume in use by a storage system. Volumes may be considered pointers into graph 200.

The term "medium" as is used herein is defined as a logical grouping of data. A medium may have a corresponding identifier with which to identify the logical grouping of data. Each medium may also include or be associated with mappings of logical block numbers to content location, deduplication entries, and other information. In one embodiment, medium identifiers may be used by the storage controller but medium identifiers may not be user-visible. A user (or client) may send a data request accompanied by a volume ID to specify which data is targeted by the request, and the storage controller may map the volume ID to a medium ID and then use the medium ID when processing the request.

The term medium is not to be confused with the terms "storage medium" or "computer readable storage medium". A storage medium is defined as an actual physical device (e.g., SSD, HDD) that is utilized to store data. A computer readable storage medium (or non-transitory computer readable storage medium) is defined as a physical storage medium configured to store program instructions which are executable by a processor or other hardware device. Various types of program instructions that implement the methods and/or mechanisms described herein may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

It is also noted that the term "volume to medium mapping table" may refer to multiple tables rather than just a single table. Similarly, the term "medium mapping table" may also refer to multiple tables rather than just a single table. It is further noted that volume to medium mapping table 205 is only one example of a volume to medium mapping table. Other volume to medium mapping tables may have other numbers of entries for other numbers of volumes.

Each medium is depicted in graph 200 as three conjoined boxes, with the leftmost box showing the medium ID, the middle box showing the underlying medium, and the rightmost box displaying the status of the medium (RO—read-only) or (RW—read-write). Read-write mediums may be referred to as active mediums, while read-only mediums may represent previously taken snapshots. Within graph 200, a medium points to its underlying medium. For example, medium 20 points to medium 12 to depict that medium 12 is the underlying medium of medium 20. Medium 12 also points to medium 10, which in turn points to medium 5, which in turn points to medium 1. Some mediums are the underlying medium for more than one higher-level medium. For example, three separate mediums (12, 17, 11) point to medium 10, two separate mediums (18, 10) point to medium 5, and two separate mediums (6, 5) point to medium 1. Each of the mediums which is an underlying medium to at least one higher-level medium has a status of read-only.

The set of mediums on the bottom left of graph 200 is an example of a linear set. As depicted in graph 200, medium 3 was created first and then a snapshot was taken resulting in medium 3 becoming stable (i.e., the result of a lookup for a given block in medium 3 will always return the same value after this point). Medium 7 was created with medium 3 as its underlying medium. Any blocks written after medium 3 became stable were labeled as being in medium 7. Lookups to medium 7 return the value from medium 7 if one is found, but will look in medium 3 if a block is not found in medium 7. At a later time, a snapshot of medium 7 is taken, medium 7 becomes stable, and medium 14 is created. Lookups for blocks in medium 14 would check medium 7 and then medium 3 to find the targeted logical block. Eventually, a snapshot of medium 14 is taken and medium 14 becomes stable while medium 15 is created. At this point in graph 200, medium 14 is stable with writes to volume 102 going to medium 15.

Volume to medium mapping table 205 maps user-visible volumes to mediums. Each volume may be mapped to a single medium, also known as the anchor medium. This anchor medium, as with all other mediums, may take care of its own lookups. A medium on which multiple volumes depend (such as medium 10) tracks its own blocks independently of the volumes which depend on it. Each medium may also be broken up into ranges of blocks, and each range may be treated separately in medium DAG 200.

Referring now to FIG. 3, one embodiment of a medium mapping table 300 is shown. Any portion of or the entirety of medium mapping table 300 may be stored in storage controller 110 and/or in one or more of storage devices 135A-N. A volume identifier (ID) may be used to access volume to medium mapping table 205 to determine a medium ID corresponding to the volume ID. This medium ID may then be used to access medium mapping table 300. It is noted that table 300 is merely one example of a medium mapping table, and that in other embodiments, other medium mapping tables, with other numbers of entries, may be utilized. In addition, in other embodiments, a medium mapping table may include other attributes and be organized in a different manner than that shown in FIG. 3. It is also noted that any suitable data structure may be used to store the mapping table information in order to provide for efficient searches (e.g., b-trees, binary trees, hash tables, etc.). All such data structures are contemplated.

Each medium may be identified by a medium ID, as shown in the leftmost column of table 300. A range attribute may also be included in each entry of table 300, and the range may be in terms of data blocks. The size of a block of data (e.g., 4 KB, 8 KB) may vary depending on the embodiment. A medium may be broken up into multiple ranges, and each range of a medium may be treated as if it is an independent medium with its own attributes and mappings. For example, medium ID 2 has two separate ranges. Range 0-99 of medium ID 2 has a separate entry in table 300 from the entry for range 100-999 of medium ID 2.

Although both of these ranges of medium ID 2 map to underlying medium ID 1, it is possible for separate ranges of the same source medium to map to different underlying mediums. For example, separate ranges from medium ID 35 map to separate underlying mediums. For example, range 0-299 of medium ID 35 maps to underlying medium ID 18 with an offset of 400. This indicates that blocks 0-299 of medium ID 35 map to blocks 400-699 of medium ID 18. Additionally, range 300-499 of medium ID 35 maps to underlying medium ID 33 with an offset of −300 and range 500-899 of medium ID 35 maps to underlying medium ID 5 with an offset of −400. These entries indicate that blocks 300-499 of medium ID 35 map to blocks 0-199 of medium ID 33, while blocks 500-899 of medium ID 35 map to blocks 100-499 of medium ID 5. It is noted that in other embodiments, mediums may be broken up into more than three ranges.

The state column of table 300 records information that allows lookups for blocks to be performed more efficiently. A state of "Q" indicates the medium is quiescent, "R" indicates the medium is registered, and "U" indicates the medium is unmasked. In the quiescent state, a lookup is performed on exactly one or two mediums specified in table 300. In the registered state, a lookup is performed recursively. The unmasked state determines whether a lookup should be performed in the basis medium, or whether the lookup should only be performed in the underlying medium. Although not shown in table 300 for any of the entries, another state "X" may be used to specify that the source medium is unmapped. The unmapped state indicates that the source medium contains no reachable data and can be discarded. This unmapped state may apply to a range of a source medium. If an entire medium is unmapped, then the medium ID may be entered into a sequence invalidation table and eventually discarded.

In one embodiment, when a medium is created, the medium is in the registered state if it has an underlying medium, or the medium is in the quiescent state if it is a brand-new volume with no pre-existing state. As the medium is written to, parts of it can become unmasked, with mappings existing both in the medium itself and the underlying medium. This may be done by splitting a single range into multiple range entries, some of which retain the original masked status, and others of which are marked as unmasked.

In addition, each entry in table 300 may include a basis attribute, which indicates the basis of the medium, which in this case points to the source medium itself. Each entry may also include an offset field, which specifies the offset that should be applied to the block address when mapping the source medium to an underlying medium. This allows mediums to map to other locations within an underlying medium rather than only being built on top of an underlying medium from the beginning block of the underlying medium. As shown in table 300, medium 8 has an offset of 500, which indicates that block 0 of medium 8 will map to block 500 of its underlying medium (medium 1). Therefore, a lookup of medium 1 via medium 8 will add an offset of 500 to the original block number of the request. The offset column allows a medium to be composed of multiple mediums. For example, in one embodiment, a medium may be composed of a "gold master" operating system image and per-VM (virtual machine) scratch space. Other flexible mappings are also possible and contemplated.

Each entry also includes an underlying medium attribute, which indicates the underlying medium of the source medium. If the underlying medium points to the source medium (as with medium 1), then this indicates that the source medium does not have an underlying medium, and all lookups will only be performed in the source medium. Each entry may also include a stable attribute, with "Y" (yes) indicating the medium is stable (or read-only), and with "N" (no) indicating the medium is read-write. In a stable medium, the data corresponding to a given block in the medium never changes, though the mapping that produces this data may change. For example, medium 2 is stable, but block 50 in medium 2 might be recorded in medium 2 or in medium 1, which may be searched logically in that order, though the searches may be done in parallel if desired. In one embodiment, a medium will be stable if the medium is used as an underlying medium by any medium other than itself.

Figure 4:
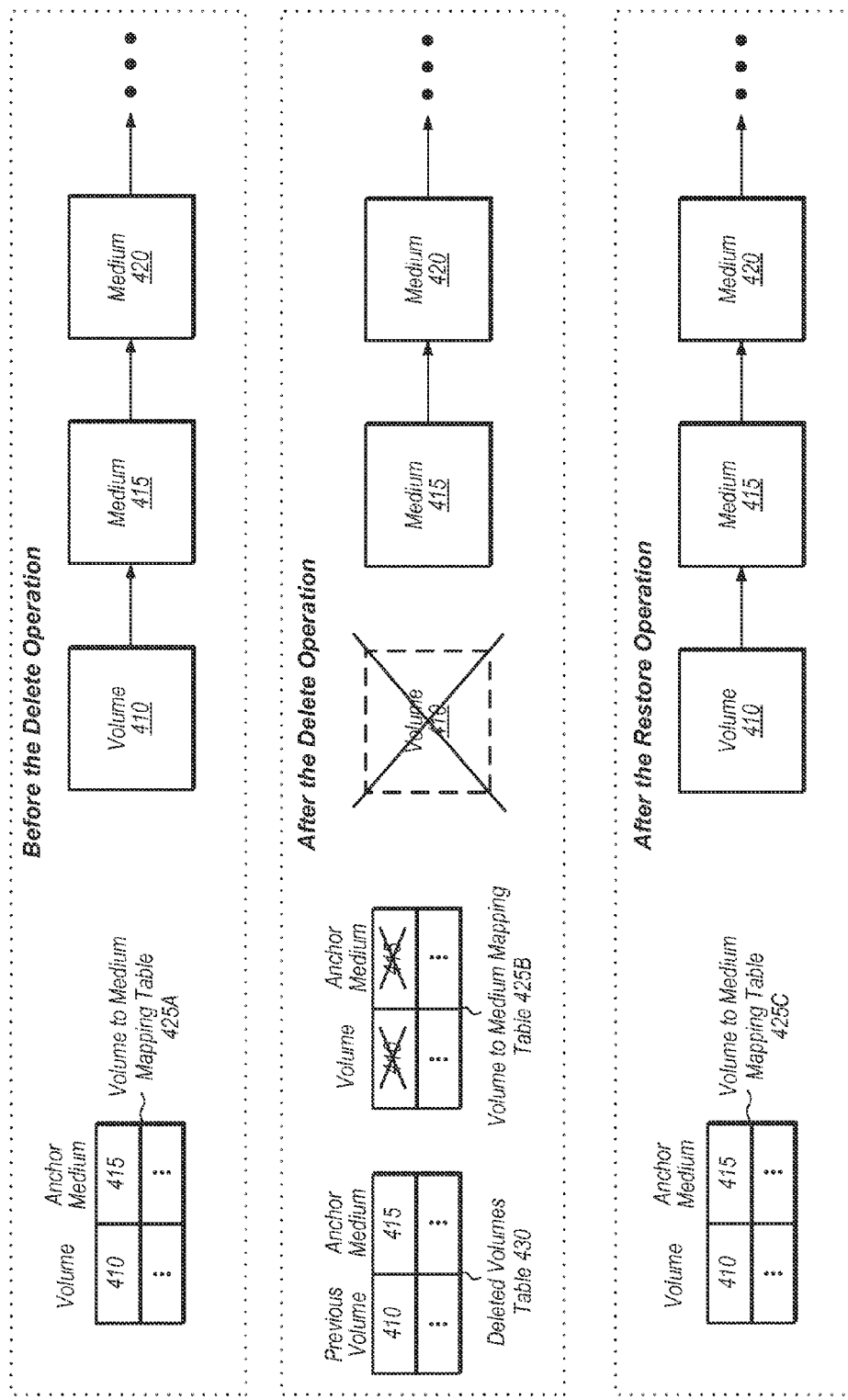
FIG. 4 illustrates one embodiment of operations to delete and restore a volume.

Turning now to FIG. 4, one embodiment of operations to delete and restore a volume is shown. A user may wish to delete a given volume, and a request to delete the given volume may be conveyed to the storage controller. The volume being deleted is represented by volume 410 in FIG. 4. Before the delete operation is performed, there may be an entry corresponding to volume 410 in volume to medium mapping table 425A, and this entry may record that medium 415 is the anchor medium of volume 410. For the purposes of discussion, it will be assumed that medium 415 has an underlying medium, and this underlying medium is shown as medium 420. Medium 420 may or may not have an underlying medium, depending on the circumstances. It is noted that in some scenarios, medium 415 may not have an underlying medium.

The storage controller may perform the delete operation of volume 410 by recording the previous mapping of volume 410 to anchor medium 415 in deleted volumes table 430 and deleting the entry corresponding to volume 410 in volume to medium mapping table 425B. The volume and anchor medium numbers are crossed out in volume to medium mapping table 425B to represent that this entry has been deleted from table 425B. Also, the block diagram shows volume 410 as being crossed out to represent that volume 410 has been deleted and that there is no longer a link between volume 410 and medium 415.

When the entry corresponding to volume 410 is deleted from volume to medium mapping table 425B, this effectively deletes volume 410 from the storage system. As a result of volume 410 being deleting, its anchor medium (medium 415) will become stable. Deleted volumes table 430 is one type of storage structure that may be utilized to store information about deleted volumes and their previous connections to anchor mediums. In other embodiments, other types of structures and other ways of storing this information may be utilized. This information may be stored so as to allow restore operations of deleted volumes to be performed at a later point in time. Additionally, the entries corresponding to medium 415, medium 420, and any other underlying mediums in a medium mapping table (not shown) may be retained after the delete operation. The storage controller may retain medium 415 for a period of time after the delete operation has been performed. In some cases, if medium 415 is utilized by other volumes or if other mediums use medium 415 as an underlying medium, then medium 415 will be retained indefinitely.

At some point in time after the delete operation of volume 410 has been performed, a restore operation of volume 410 may be requested by a user. The storage controller may restore volume 410 based on the information stored in deleted volumes table 430. The dashed box at the bottom of FIG. 4 shows the status of volume to medium mapping table 425C after the restore operation has been performed. The restore operation results in volume 410 being reconnected to medium 415. In other words, the restore operation has restored volume 410 to the state it was in before the delete operation was performed. The status of medium 415 may also be updated at this time from stable to active.

Generally speaking, the storage controller may retain the deleted volume linkage information for a minimum amount of time following a delete operation of a given volume. Alternatively, the storage controller may retain the deleted volume linkage information until space is needed to store other data. When the storage controller has waited for this specified amount of time, then the linkage information corresponding to the given volume may be deleted. At this time, the storage controller may immediately reclaim the given anchor medium of this deleted volume, or the storage controller may wait until a later point in time which is more convenient for reclaiming the given anchor medium. In some cases, the storage controller may wait to reclaim the given anchor medium until a later point in time when space is needed to store other data. Any underlying mediums of this given anchor medium may also be reclaimed if they are no longer utilized by other volumes or mediums.

Figure 5:
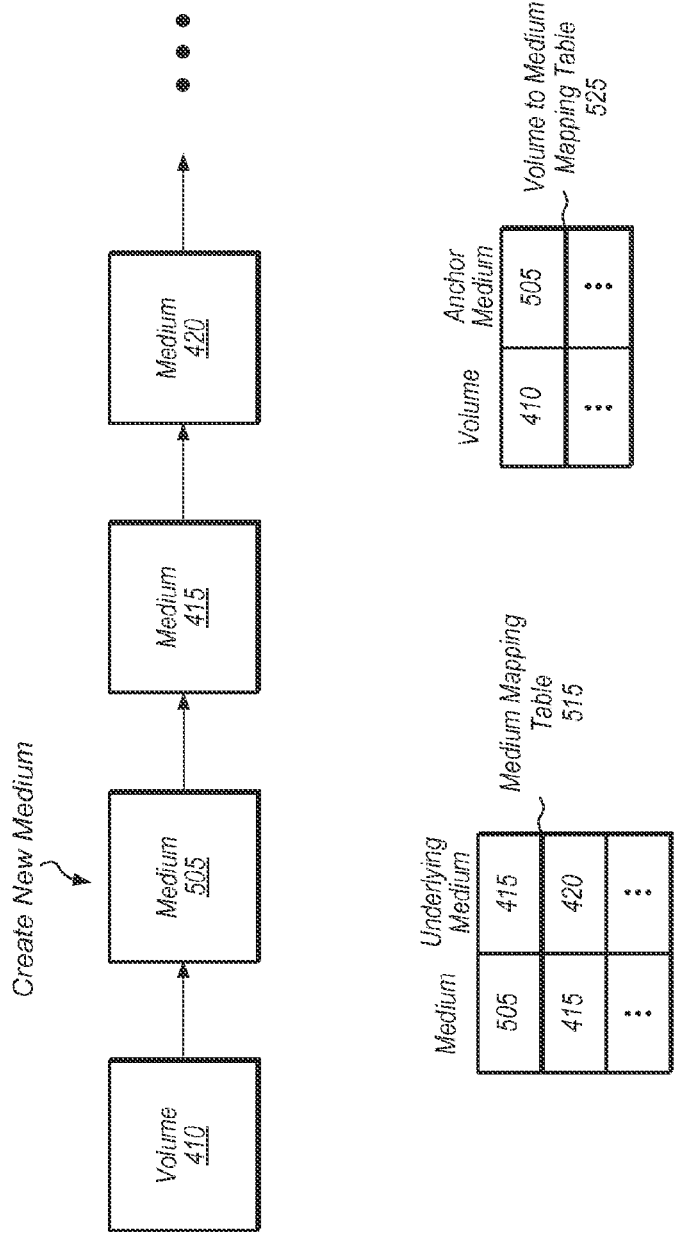
FIG. 5 illustrates one embodiment of an alternative operation to restore a deleted volume.

Referring now to FIG. 5, one embodiment of an alternative operation to restore a deleted volume is shown. In this embodiment, the operation to restore the previously deleted volume 410 involves creating a new medium (medium 505) after receiving the request to restore volume 410. Then, a new entry may be created in medium mapping table 515 for medium 505, and an indication that medium 415 underlies medium 505 may be stored in this new entry. The existing entry for medium 415 is also shown in medium mapping table 515, and this existing entry lists medium 420 as the underlying medium of medium 415.

Also, a new entry may be created in volume to medium mapping table 525, and medium 505 may be recorded as the anchor medium of volume 410 in this new entry. As can be seen from the diagram in FIG. 5, after the restore operation, volume 410 now points to medium 505, and medium 505 points to medium 415. By creating medium 505 and placing medium 505 between volume 410 and its previous anchor medium (medium 415), the storage controller ensures that any changes that occur to volume 410 after it has been restored can be distinguished from changes that occurred prior to volume 410 being deleted.

Figure 6:
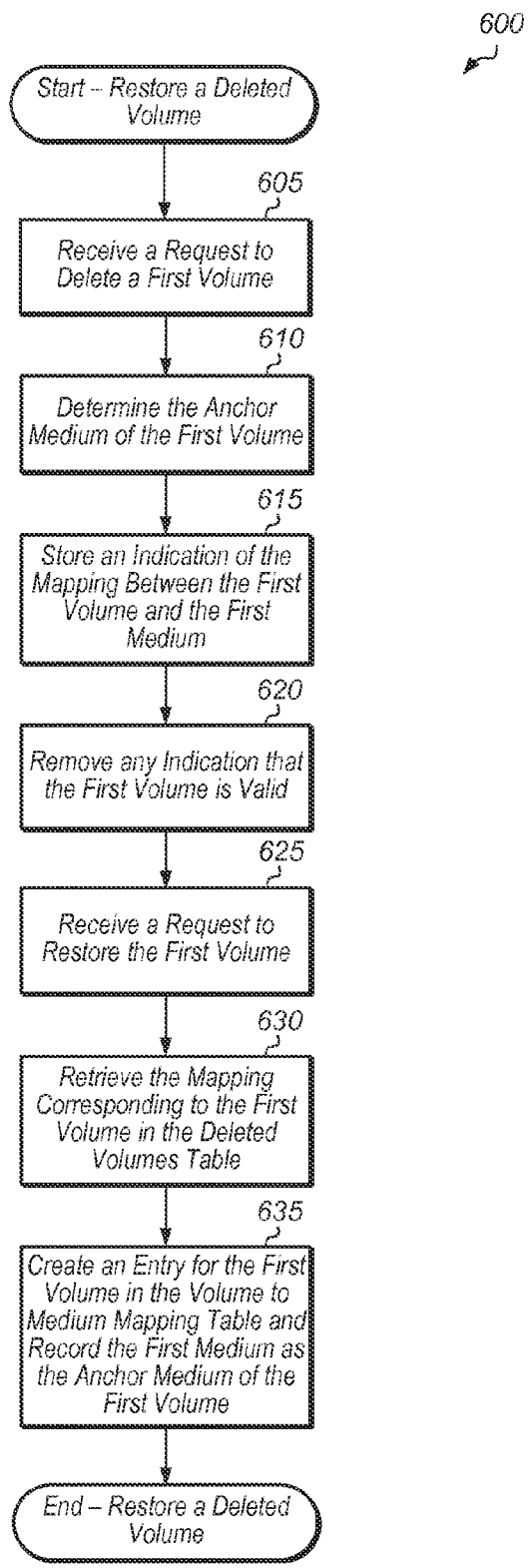
FIG. 6 is a generalized flow diagram illustrating one embodiment of a method for undoing volume operations.

Turning now to FIG. 6, one embodiment of a method 600 for undoing volume operations is shown. The components embodied in system 100 described above (e.g., storage controller 110) may generally operate in accordance with method 600. In addition, the steps in this embodiment are shown in sequential order. However, some steps may occur in a different order than shown, some steps may be performed concurrently, some steps may be combined with other steps, and some steps may be absent in another embodiment.

The storage controller may receive a request to delete a first volume (block 605). In response to receiving this request, the storage controller may determine the anchor medium of the first volume (block 610). The storage controller may determine the anchor medium from the entry corresponding to the first volume in the volume to medium mapping table. The anchor medium of the first volume may be referred to as the "first medium" for the purposes of this discussion. Next, the storage controller may store an indication of the mapping between the first volume and first medium (block 615). In one embodiment, this mapping may be stored in a deleted volumes table. In other embodiments, the mapping may be stored in any other suitable structure (e.g., log file). In one embodiment, this mapping may be retained for a fixed amount of time after the first volume is deleted. It is intended for the storage controller to retain this mapping for a suitable period of time to allow the user to restore the first volume if so desired. Once this amount of time has elapsed, the mapping may be deleted. In another embodiment, the mapping may be retained indefinitely. It is noted that once the mapping is deleted, the storage controller will be unable to restore the first volume to its previous state.

Next, the storage controller may remove any indication that the first volume is valid (block 620). By removing any indication that the first volume is valid, the storage controller makes the first volume unavailable to the user. In one embodiment, the storage controller may remove any indication that the first volume is valid by deleting the entry corresponding to the first volume in the volume to medium mapping table. This action may effectively delete the first volume from the storage system. In other embodiments, the storage controller may use other techniques for maintaining mappings between volumes to mediums besides storing this information in a table. In these embodiments, the storage controller may update the status of the first volume in any suitable fashion. Also, after a fixed amount of time has elapsed, the storage controller may mark the first medium as ready to be reclaimed, and then the first medium may be deleted the next time garbage collection operations are performed. In some cases, the storage controller may prioritize reclamation of other types of free space ahead of deleted volumes. For example, the storage controller may try to claim unreachable space (due to overwrites) ahead of reclaiming space from deleted volumes. It is noted that once the first medium is deleted, the storage controller will be unable to restore the first volume to its previous state. However, the storage controller may retain the first medium for a considerable period of time to allow for a restore operation to restore the first volume to its previous state if the user requests this restore operation.

Then, after block 620, at a later point in time, the storage controller may receive a request to restore the first volume (block 625). For example, a user may realize that the first volume was deleted by mistake and therefore may want to restore the first volume to its previous state. It may be assumed that this request to restore the first volume is received by the storage controller prior to the mapping of the first volume to the first medium being deleted and prior to the first medium being deleted. In response to receiving the request to restore the first volume, the storage controller may retrieve the mapping corresponding to the first volume in the deleted volumes table (block 630). Then, using this retrieved mapping, the storage controller may create an entry for the first volume in the volume to medium mapping table, and this entry may record the first medium as the anchor medium of the first volume (block 635). By creating this entry for the first volume in the volume to medium mapping table, the storage controller is restoring the first volume to its previous state. After block 635, method 600 may end.

Figure 7:
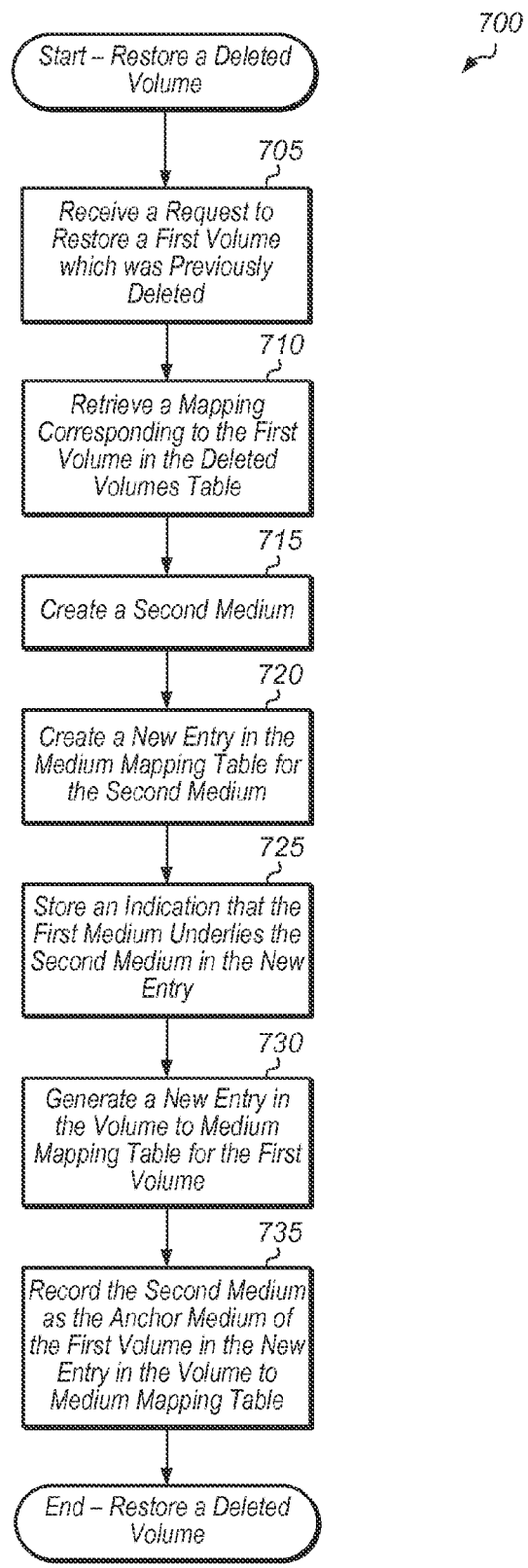
FIG. 7 is a generalized flow diagram illustrating one embodiment of an alternative method for restoring a deleted volume.

Referring now to FIG. 7, one embodiment of an alternative method 700 for restoring a deleted volume is shown. The components embodied in system 100 described above (e.g., storage controller 110) may generally operate in accordance with method 700. In addition, the steps in this embodiment are shown in sequential order. However, some steps may occur in a different order than shown, some steps may be performed concurrently, some steps may be combined with other steps, and some steps may be absent in another embodiment.

A storage controller may receive a request to restore a first volume which was previously deleted (block 705). In response to receiving this request, the storage controller may retrieve a mapping corresponding to the first volume in the deleted volumes table (block 710). The retrieved mapping may store an identification of the anchor medium of the first volume prior to the first volume being deleted, and this anchor medium may be referred to as the "first medium" for the purposes of this discussion. Also in response to receiving this request, the storage controller may create a new medium (block 715). This new medium may be referred to as the "second medium" for the purposes of this discussion. Then, the storage controller may create a new entry in the medium mapping table for the second medium (block 720). The storage controller may store an indication that the first medium underlies the second medium in this new entry in the medium mapping table (block 725).

Also, the storage controller may generate a new entry in the volume to medium mapping table for the first volume (block 730). The storage controller may record the second medium as the anchor medium of the first volume in this new entry in the volume to medium mapping table (block 735). Method 700 is an alternative implementation for restoring a previously deleted volume. In this alternative implementation, by creating a new medium and pointing the restored volume to this new medium, the storage controller is ensuring that changes to the restored volume can be distinguished from any changes that happened before the volume was deleted.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
   one or more storage devices; and
   a storage controller coupled to the one or more storage devices, wherein the storage controller is configured to:
      receive a request to delete a first volume mapped to a first medium, wherein the first medium is a logical grouping of data;
      responsive to receiving the request to delete the first volume:
         determine the first medium is an anchor medium of the first volume;
         store an indication that the first volume was previously linked to the first medium; and
         remove any indication that the first volume is valid.

2. The computer system as recited in claim 1, wherein the storage controller is further configured to maintain a volume to medium mapping table to track relationships between volumes and anchor mediums, and wherein removing any indication that the first volume is valid comprises deleting a first entry corresponding to the first volume from the volume to medium mapping table.

3. The computer system as recited in claim 2, wherein after receiving the request to delete the first volume, the storage controller is further configured to:
receive a request to restore the first volume;
responsive to receiving the request to restore the first volume:
retrieve the indication that the first volume was previously linked to the first medium; and
create a new entry in the volume to medium mapping table, wherein the new entry links the first volume to the first medium.

4. The computer system as recited in claim 2, wherein after receiving the request to delete the first volume, the storage controller is configured to:
receive a request to restore the first volume;
responsive to receiving the request to restore the first volume:
retrieve the indication that the first volume was previously linked to the first medium;
create a second medium;
store an indication that the first medium underlies the second medium; and
create a new entry in the volume to medium mapping table, wherein the new entry links the first volume to the second medium.

5. The computer system as recited in claim 1, wherein responsive to receiving the request to delete the first volume, the storage controller is further configured to delay deletion of the first medium for a first period of time.

6. The computer system as recited in claim 5, wherein after the first period of time has elapsed, the storage controller is configured to mark the first medium as ready to be reclaimed.

7. The computer system as recited in claim 6, wherein after the first period of time has elapsed, the storage controller is further configured to mark a second medium as ready to be reclaimed if the second medium underlies the first medium and if no other mediums are linked to the second medium.

8. A method for use in a storage system, the method comprising:
receiving a request to delete a first volume mapped to a first medium, wherein the first medium is a logical grouping of data;
responsive to receiving the request to delete the first volume:
determining the first medium is an anchor medium of the first volume;
storing an indication that the first volume was previously linked to the first medium; and
removing any indication that the first volume is valid.

9. The method as recited in claim 8, further comprising maintaining a volume to medium mapping table to track relationships between volumes and anchor mediums, and wherein removing any indication that the first volume is valid comprises deleting a first entry corresponding to the first volume from the volume to medium mapping table.

10. The method as recited in claim 9, wherein after receiving the request to delete the first volume, the method further comprising:
receiving a request to restore the first volume;
responsive to receiving the request to restore the first volume:
retrieving the indication that the first volume was previously linked to the first medium; and
creating a new entry in the volume to medium mapping table, wherein the new entry links the first volume to the first medium.

11. The method as recited in claim 9, wherein after receiving the request to delete the first volume, the method further comprising:
receiving a request to restore the first volume;
responsive to receiving the request to restore the first volume:
retrieving the indication that the first volume was previously linked to the first medium;
creating a second medium;
storing an indication that the first medium underlies the second medium; and
creating a new entry in the volume to medium mapping table, wherein the new entry links the first volume to the second medium.

12. The method as recited in claim 8, wherein responsive to receiving the request to delete the first volume, the method further comprising delaying deletion of the first medium for a first period of time.

13. The method as recited in claim 12, wherein after the first period of time has elapsed, the method comprising marking the first medium as ready to be reclaimed.

14. The method as recited in claim 13, wherein after the first period of time has elapsed, the method further comprising marking a second medium as ready to be reclaimed if the second medium underlies the first medium and if no other mediums are linked to the second medium.

15. A non-transitory computer readable storage medium storing program instructions, wherein the program instructions are executable by a processor to:
receive a request to delete a first volume mapped to a first medium, wherein the first medium is a logical grouping of data;
responsive to receiving the request to delete the first volume:
determine the first medium is an anchor medium of the first volume;
store an indication that the first volume was previously linked to the first medium; and
remove any indication that the first volume is valid.

16. The computer readable storage medium as recited in claim 15, wherein the program instructions are further executable by a processor to maintain a volume to medium mapping table to track relationships between volumes and anchor mediums, and wherein removing any indication that the first volume is valid comprises deleting a first entry corresponding to the first volume from the volume to medium mapping table.

17. The computer readable storage medium as recited in claim 16, wherein after receiving the request to delete the first volume, the program instructions are further executable by a processor to:
receive a request to restore the first volume;
responsive to receiving the request to restore the first volume:
retrieve the indication that the first volume was previously linked to the first medium; and
create a new entry in the volume to medium mapping table, wherein the new entry links the first volume to the first medium.

18. The computer readable storage medium as recited in claim 16, wherein after receiving the request to delete the first volume, the program instructions are further executable by a processor to:
receive a request to restore the first volume;
responsive to receiving the request to restore the first volume:
retrieve the indication that the first volume was previously linked to the first medium;
create a second medium;

store an indication that the first medium underlies the second medium; and create a new entry in the volume to medium mapping table, wherein the new entry links the first volume to the second medium.

19. The computer readable storage medium as recited in claim 15, wherein responsive to receiving the request to delete the first volume, the program instructions are further executable by a processor to delay deletion of the first medium for a first period of time.

20. The computer readable storage medium as recited in claim 19, wherein after the first period of time has elapsed, the program instructions are executable by a processor to mark the first medium as ready to be reclaimed.

* * * * *